(12) United States Patent
Kapp et al.

(10) Patent No.: US 11,985,112 B2
(45) Date of Patent: *May 14, 2024

(54) SECURING DATA IN MOTION BY ZERO KNOWLEDGE PROTOCOL

(71) Applicant: BAE Systems Information and Electronic Systems Integration Inc., Nashua, NH (US)

(72) Inventors: Benjamin Kapp, San Diego, CA (US); Jibu Abraham, San Diego, CA (US); Kevan O. Vanhoff, Portland, OR (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 27 days.

This patent is subject to a terminal disclaimer.

(21) Appl. No.: 16/223,181

(22) Filed: Dec. 18, 2018

(65) Prior Publication Data

US 2020/0195617 A1 Jun. 18, 2020

(51) Int. Cl.
*H04L 9/40* (2022.01)
*H04L 9/06* (2006.01)
*H04L 9/32* (2006.01)

(52) U.S. Cl.
CPC ........ *H04L 63/0428* (2013.01); *H04L 9/0643* (2013.01); *H04L 9/0656* (2013.01);
(Continued)

(58) Field of Classification Search
CPC . H04L 63/0428; H04L 9/0643; H04L 9/0656; H04L 9/3221; H04L 9/3247;
(Continued)

(56) References Cited

U.S. PATENT DOCUMENTS 5,673,316 A * 9/1997 Auerbach ................. G07F 7/08
705/51
6,122,372 A * 9/2000 Hughes ................ H04L 9/3236
380/2

(Continued)

OTHER PUBLICATIONS

Secret Key; Techopedia [Online]. Janalta Interactive Inc., 2011 [retrieved on Sep. 16, 2021]. p. 1-3. Retrieved from the Internet: <URL: https://web.archive.org/web/20110926081021/https://www.techopedia.com/definition/24865/secret-key> (Year: 2011).*

(Continued)

*Primary Examiner* — Wasika Nipa
*Assistant Examiner* — Zhe Liu
(74) *Attorney, Agent, or Firm* — Finch & Maloney PLLC; Gary McFaline

(57) ABSTRACT

Techniques are disclosed for transmitting a secure message over a public or untrusted network. The techniques include receiving a message and creating multiple hash values of the message. A sending device signs and encrypts the message and hash values, then encapsulates and transmits to the message and hash values a security server. The security server receives and de-encapsulates the message and hash values, decrypts the message and hash values, and verifies the signature. The security server verifies the hash values and determines whether any changes were made to the message during transmission. If verified, the security server processes the message for transmission to the recipient. The security server creates multiple hash values of the original message, signs and encrypts the message and the hash values, encapsulates the message and hash values and transmits to a recipient device for further verification and presentation to the recipient.

14 Claims, 8 Drawing Sheets

(52) U.S. Cl.
CPC .......... *H04L 9/3221* (2013.01); *H04L 9/3247* (2013.01); *H04L 9/3263* (2013.01); *H04L 63/029* (2013.01); *H04L 63/0421* (2013.01); *H04L 63/067* (2013.01); *H04L 63/1425* (2013.01)

(58) Field of Classification Search
CPC . H04L 9/3263; H04L 63/029; H04L 63/0421; H04L 63/067; H04L 63/1425; H04L 63/142
See application file for complete search history.

(56) References Cited

U.S. PATENT DOCUMENTS

| | | | | |
|---|---|---|---|---|
| 7,519,822 | B2* | 4/2009 | Sayers | G06F 21/64 |
| | | | | 713/176 |
| 7,979,569 | B2* | 7/2011 | Eisner | H04L 29/08072 |
| | | | | 709/231 |
| 9,038,158 | B1* | 5/2015 | MacKay | H04L 63/0823 |
| | | | | 709/225 |
| 9,081,953 | B2* | 7/2015 | B'Far | G06F 21/6263 |
| 9,686,294 | B2* | 6/2017 | Kantor | H04W 4/40 |
| 9,967,236 | B1* | 5/2018 | Ashley | H04L 63/083 |
| 2004/0250140 | A1* | 12/2004 | Chavis | H04L 67/306 |
| | | | | 726/4 |
| 2005/0223231 | A1* | 10/2005 | Zhang | G06F 21/645 |
| | | | | 713/178 |
| 2008/0022374 | A1* | 1/2008 | Brown | H04L 63/0823 |
| | | | | 726/5 |
| 2009/0017839 | A1* | 1/2009 | Kim | H04W 12/088 |
| | | | | 455/456.1 |
| 2011/0185169 | A1 | 7/2011 | Munger | |
| 2013/0058229 | A1* | 3/2013 | Casado | H04L 45/745 |
| | | | | 370/252 |
| 2013/0167207 | A1 | 6/2013 | Davis et al. | |
| 2014/0304503 | A1 | 10/2014 | O'Hare et al. | |
| 2015/0067819 | A1* | 3/2015 | Shribman | H04L 67/06 |
| | | | | 726/12 |
| 2015/0295950 | A1* | 10/2015 | Chen | H04L 63/1458 |
| | | | | 726/13 |
| 2016/0095082 | A1* | 3/2016 | Lee | H04W 12/06 |
| | | | | 455/456.1 |
| 2016/0224979 | A1* | 8/2016 | Marsyla | G06Q 20/3829 |
| 2017/0222990 | A1* | 8/2017 | Romansky | H04L 9/14 |
| 2017/0353435 | A1* | 12/2017 | Pritikin | H04W 4/02 |
| 2018/0075262 | A1* | 3/2018 | Auh | G06F 16/258 |
| 2018/0145950 | A1* | 5/2018 | Tabares | H04L 61/2514 |
| 2018/0241727 | A1* | 8/2018 | Verzun | H04L 9/0662 |
| 2019/0044916 | A1* | 2/2019 | Jones | H04L 63/0421 |
| 2019/0372937 | A1* | 12/2019 | Song | H04L 63/0227 |
| 2020/0052895 | A1* | 2/2020 | Upreti | H04L 63/18 |
| 2020/0186506 | A1* | 6/2020 | Shockley | H04L 63/0421 |
| 2021/0019429 | A1* | 1/2021 | Cooner | G16Y 30/10 |
| 2021/0158442 | A1* | 5/2021 | Cui | H04L 9/0618 |

OTHER PUBLICATIONS

Time division multiplexing (TDM). The Authoritative Dictionary of IEEE Standard Terms, Seventh Edition. IEEE, 2000 [retrieved on Jul. 16, 2021]. p. 1183. Retrieved from the Internet: <URL: https://ieeexplore.ieee.org/stamp/stamp.jsp?tp=&arnumber=4116787>). (Year: 2000).*

Liaqat, Imran, and Muhammad Raheem. "Anonymous Communication." Linkoping University, Dept. of Computer and Information Science, Information Security Project Report 8 (2007) (Year: 2007).*

International Search Report, PCT/US19/66850, mail Mar. 18, 2020, 9 pages.

Benjamin Kapp et al., "Securing Data at Rest", U.S. Appl. No. 16/194,584, 38 pages, filed Nov. 19, 2018.

* cited by examiner

SECURING DATA IN MOTION BY ZERO KNOWLEDGE PROTOCOL

FIELD OF THE DISCLOSURE

This disclosure relates to secure transmission of data, and more specifically to improved data security when transmitting data from a secure network to a recipient over an untrusted network.

BACKGROUND

With the onset of the digital age, communication between interconnected devices over communication networks is becoming widespread. Countless times a day, devices communicate with each other to relay information. Oftentimes, the communication involves transmission of data that is sensitive to the sender and/or receiver. In such cases where the information is of a sensitive nature, encryption techniques can be employed to secure the data in such a way that only authorized parties can access the data and those who are not authorized cannot. Depending on the technical capability of a given eavesdropper, however, some encryption techniques are relatively easy to defeat.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples and are incorporated in and constitute a part of this specification but are not intended to limit the scope of the disclosure. The drawings, together with the remainder of the specification, serve to explain principles and operations of the described and claimed aspects and examples. For purposes of clarity, not every component may be labeled in every figure.

DETAILED DESCRIPTION

Figure 1:
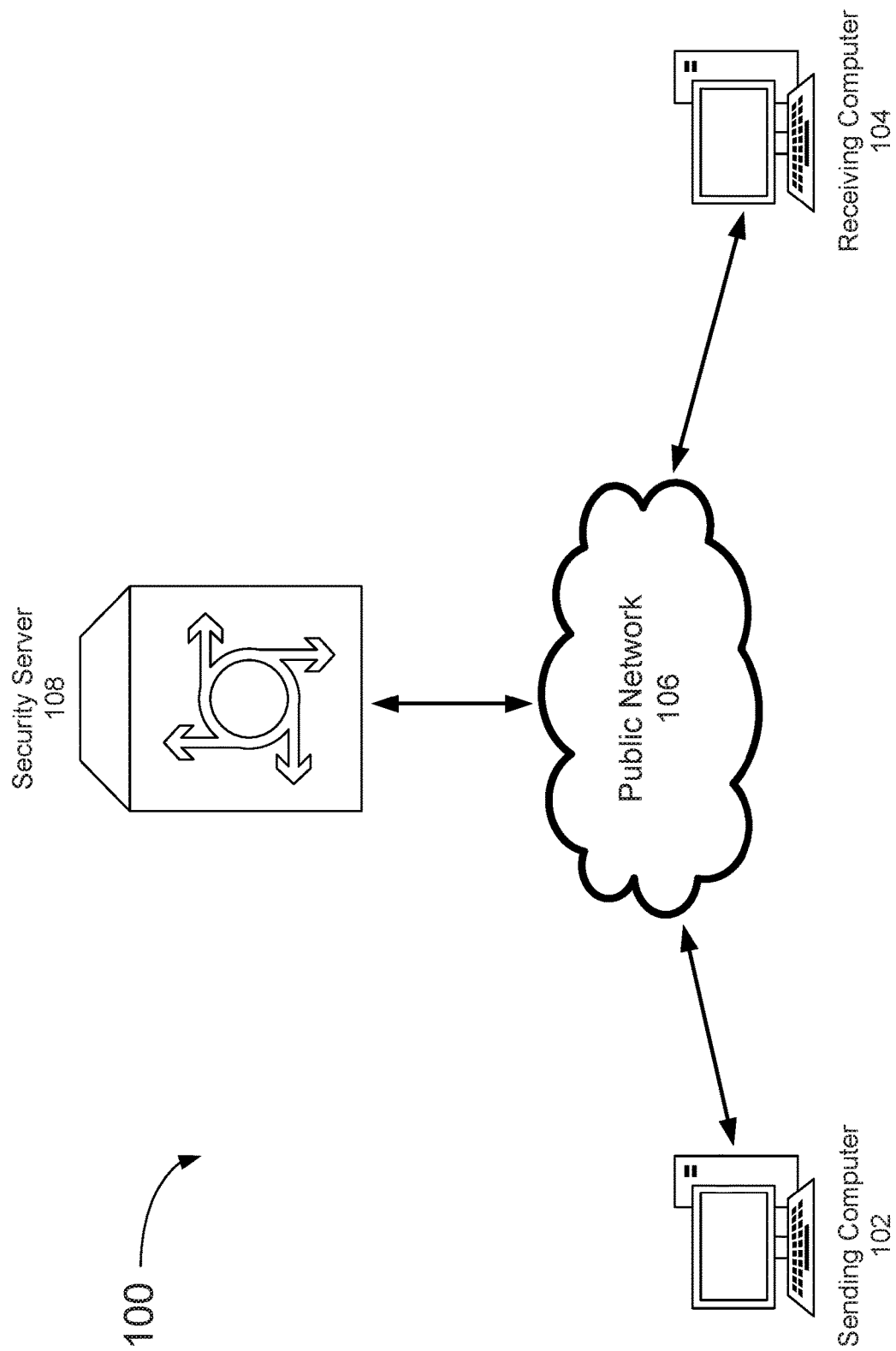
FIG. 1 depicts a schematic illustration of a sample network for transmitting secure data, in accordance with an embodiment of the present disclosure.

Given the recognized importance of maintaining the security and integrity of digital data, significant resources have been devoted to developing data security technologies to resist malicious attacks and other potentially compromising events. While secure and reliable digital storage technologies have been proposed for so-called data at rest, it is important to recognize that the data should be secure not only during storage in a storage resource, but also while outside the storage resource, such as during transmission or consumption. For example, sensitive data, such as credit card information, will ideally be secured during usage at the point of sale as well as during communication of such data to a bank or clearing house. Efforts to address this concern have focused on cryptographic schemes for the security of data during consumption and transmission. Modern cryptographic schemes involve encryption techniques that transform the data into an unintelligible form during transmission in order to conceal the data from eavesdroppers. However, as noted above, some encryption techniques are relatively more vulnerable to attack or otherwise inadequate.

For example, existing schemes for securing data during motion on an untrusted network can have various drawbacks. A malicious party can eavesdrop on communications, malicious messages can be sent anonymously or with forged sender credentials, and messages can include undecipherable data improperly encoded for the recipient to accurately decode. Additionally, threats can include zero-day vulnerabilities (e.g., a vulnerability that is unknown to the vendor or developer of a software application) and insider threats on secure networks.

Thus, and in accordance with certain of the embodiments disclosed herein, techniques and processes for securing data in motion on an untrusted network are disclosed. In accordance with various embodiments of the present disclosure, the secure data in motion techniques as described herein include enhanced data integrity, authentication, and authorization with cross domain capabilities.

According to one example embodiment, a computer program product for execution at a sending device includes one or more non-transitory machine-readable mediums encoding instructions that when executed by one or more processors cause a process to be carried out securing a message to be transmitted. The process includes receiving an initial message, generating a plurality of hash values for the initial message, digitally signing the initial message and the plurality of hash values using one or more certificates to generate a signed message and a set of signed hash values, encrypting the signed message and the set of signed hash values using at least one encryption technique to generate an encrypted message and a set of encrypted hash values, encapsulating the encrypted message and the set of encrypted hash values using at least one encapsulation protocol to create an encapsulated message and an encapsulated set of hash values, and causing transmission of the encapsulated message and the encapsulated set of hash values over an untrusted network.

According to a second example embodiment, a communication system includes one or more non-transitory machine-readable mediums configured to store instructions and one or more processors configured to execute the instructions stored on the one or more non-transitory machine-readable mediums. When executed, the instructions cause the one or more processors to receive an initial message, generate a plurality of hash values for the initial message, digitally sign the initial message and the plurality of hash values using one or more certificates to generate a signed message and a set of signed hash values, encrypt the signed message and the set of signed hash values using at least one encryption technique to generate an encrypted message and a set of encrypted hash values, encapsulate the encrypted message and the set of encrypted hash values using at least one encapsulation protocol to create an encapsulated message and an encapsulated set of hash values, and cause transmission of the encapsulated message and the encapsulated set of hash values over an untrusted network.

In each of the above example embodiments, upon transmission of the encapsulated message and the encapsulated set of hash values, the data is directed to a security server. The security server can be configured to receive the data, verify data integrity of the message and verify authenticity of the message and authorization of the message. Upon verification, the security server can process the message accordingly and transmit to a recipient device. Upon receipt, the recipient device can repeat the verification process before providing the message data to a user of the recipient device.

Example use cases are instructive as to how the techniques provided herein can be employed. In one example use case, for instance, assume a sender (herein after termed "Alice") that is on a trusted network such as a company-controlled Intranet wants to send data to an intended recipient (herein after termed "Bob") that is currently on an untrusted network such as the Internet. Alice can use a computing device (sometimes referred to herein as a "sending device," "sending computer," or "data transmission device") to send data to a computing device (sometimes referred to herein as an "intended recipient device" or "receiving computer") being used by or otherwise associated with Bob. The sending device can apply a particular set of security protocols to the message prior to sending that can be used to both secure the data during transmission to Bob but also provide data integrity and message authentication when received by Bob.

For example, the security protocols can include creating multiple hashes or hash values of the original message. The original message and the hash values can be digitally signed by the sending device and the signed message and hash values can be encrypted. The encrypted message and hash values can be encapsulated using, for example, a tunneling protocol and then transmitted to a security server for further processing. The security server can receive the encrypted message and hash values and perform an opposite process as the sending device. For example, the security server can de-encapsulate the message and the hash values. The security server can further decrypt the message and hash values and verify the signature certificates associated with the message and hash values. The security server can verify the hash values and determine whether any changes were made to the message during the transmission. If the message and the hash values are verified by the security server, the security server can process the message to secure for transmission to the intended recipient. In certain implementations, the security server can perform a similar process as the sending device. For example, the security server can create multiple hashes or hash values of the original message, digitally sign the message and the hash values, and encrypt the message and the hash values. The encrypted message and hash values can be encapsulated then transmitted by the security server to the recipient computing device for further verification and presentation of the message to Bob. At the recipient computer, a similar verification as performed by the security server can be used to verify that the message has maintained data integrity, the sender has been authenticated, and the recipient Bob is authorized to receive and view the message.

Thus, the foregoing framework provides a robust multi-device security protocol for transmitting secure or classified information from the sending device to the intended recipient device that provides high assurance of the security of the data in motion. The added security resulting from the various security protocols being performed by both the sending device and the security server prior to delivery to the intended recipient device provides for anonymity, immunity to eavesdropping, and undecipherable communications. The disclosed techniques improve the security and integrity of data communication by providing enhanced data integrity, authentication, and authorization with cross domain capabilities. These and other advantages and alternative embodiments will be apparent in light of this disclosure.

System Architecture

Turning now to the figures, FIG. 1 is a schematic illustration of a sample network for transmitting secure data, in accordance with an embodiment of the present disclosure. More specifically, network 100 as shown in FIG. 1 illustrates a sample architecture for implementing the secure data transmission techniques as described herein. In network 100, a user of a computing device such as sending computer 102 can securely transmit a message to one or more intended recipients. For example, as shown in FIG. 1, a sender can securely transmit a message to receiving computer 104. In certain implementations, the sending computer 102 can be located in a secure network such as a company-controlled Intranet. The recipient computer 104 can be located in a public or untrusted network such as the Internet or, as shown in FIG. 1, can be operably connected to the sending computer 102 via a public network 106 such as the Internet. In certain implementations, the receiving computer 104 can be located in a secure network such as a second company-controlled Intranet located at a remote location from the sending computer 102 and, as shown in FIG. 1, can be coupled to the sending computer via public network 106.

To implement the techniques as described herein, the network 106 can further include a security server 108 configured to provide enhanced security features. As shown in FIG. 1, the security server can be located in a remote location from both sending computer 102 and receiving computer 104 and operably coupled to both via the public network 106. However, it should be noted that this arrangement is provided by way of example only. In certain implementations, the location of the security server 108 can vary from that as shown in the example network 100. For example, the security server 108 can be located within the same secure network as the sending computer 102. In another example, the security server 108 can be located within the same secure network as the receiving computer 104.

In certain implementations, in order to provide secure data transfers with enhanced integrity, authentication, and authorization across multiple domains (e.g., one or more secure networks and a public network such as the example shown in FIG. 1), all data transferred between the sending computer and the recipient computer (or, alternatively, a set of data having a specific security or confidentiality level) can be first directed to the security server for authorization and authentication, and then can be directed to the recipient computer.

Figure 2:
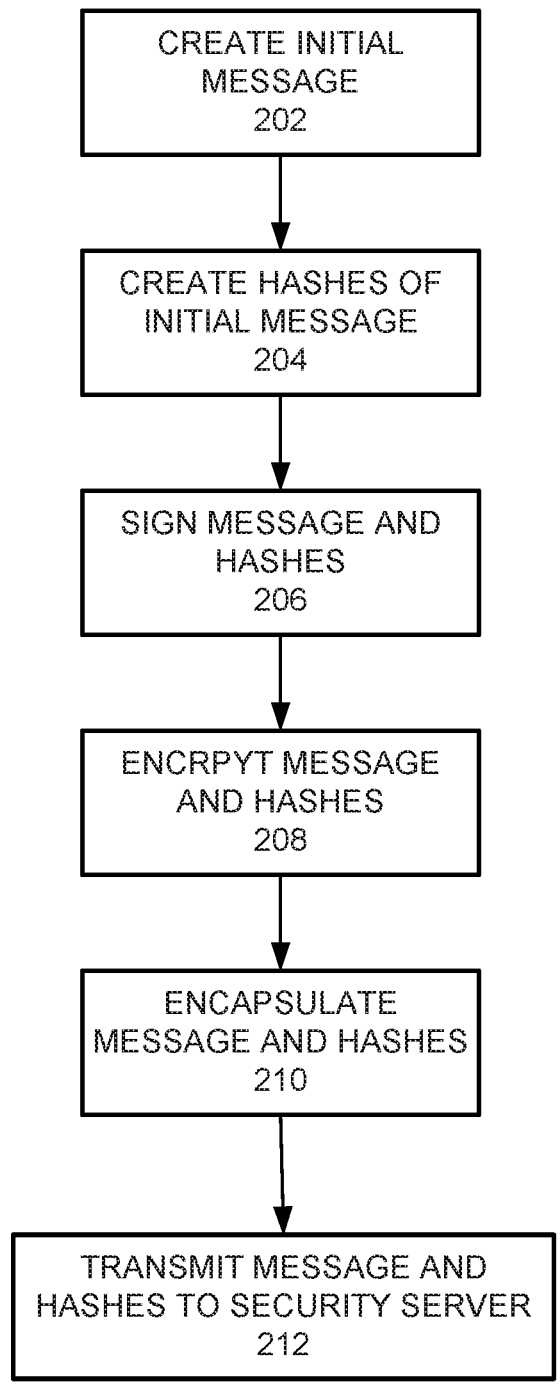
FIG. 2 depicts a flow diagram illustrating an example process for processing a message to be sent securely, in accordance with an embodiment of the present disclosure.

Referring now to FIG. 2, a sample process for generating a secure message at, for example, a data transmitting device similar to sending computer 102 as described above in reference to FIG. 1. For example, the process steps as shown in FIG. 2 can be performed by one or more processing devices integrated into the data transmitting device and being configured to execute one or more instructions to perform one or more operations.

As shown in FIG. 2, the process can begin when a user creates 202 an initial message. The initial message can include secure or classified information such as financial records, military plans or details, medical information, development plans, and other similar secure information. The one or more processors can create 204 a set of hash values for the initial message. For example, the set of hash values can be created 204 using the latest variants of unbroken cryptographic hash functions. A cryptographic hash function uses a mathematical algorithm to map data of arbitrary size to a bit string of a fixed size (the hash) and is designed to be a one-way function, that is, a function which is infeasible to invert. Typically, the only way to recreate the input data from an ideal cryptographic has function's output is to attempt a brute force search of all possible inputs to see if they produce a match. By using multiple hash functions as described herein, even if one of the cryptographic hash functions is broken, it is unlikely that all of the other cryptographic hash functions will be broken simultaneously. Thus, by using multiple cryptographic hash functions, the process mitigates the risk to data integrity of the original message. Examples of cryptographic hash functions that can used herein to create 204 the hash values of the initial message include MD6, SHA-3, BLAKE2b, Kangaroo Twelve, Whirlpool, RIPEMD-320, Tiger-192, and other commonly used cryptographic hash functions.

Figure 3:
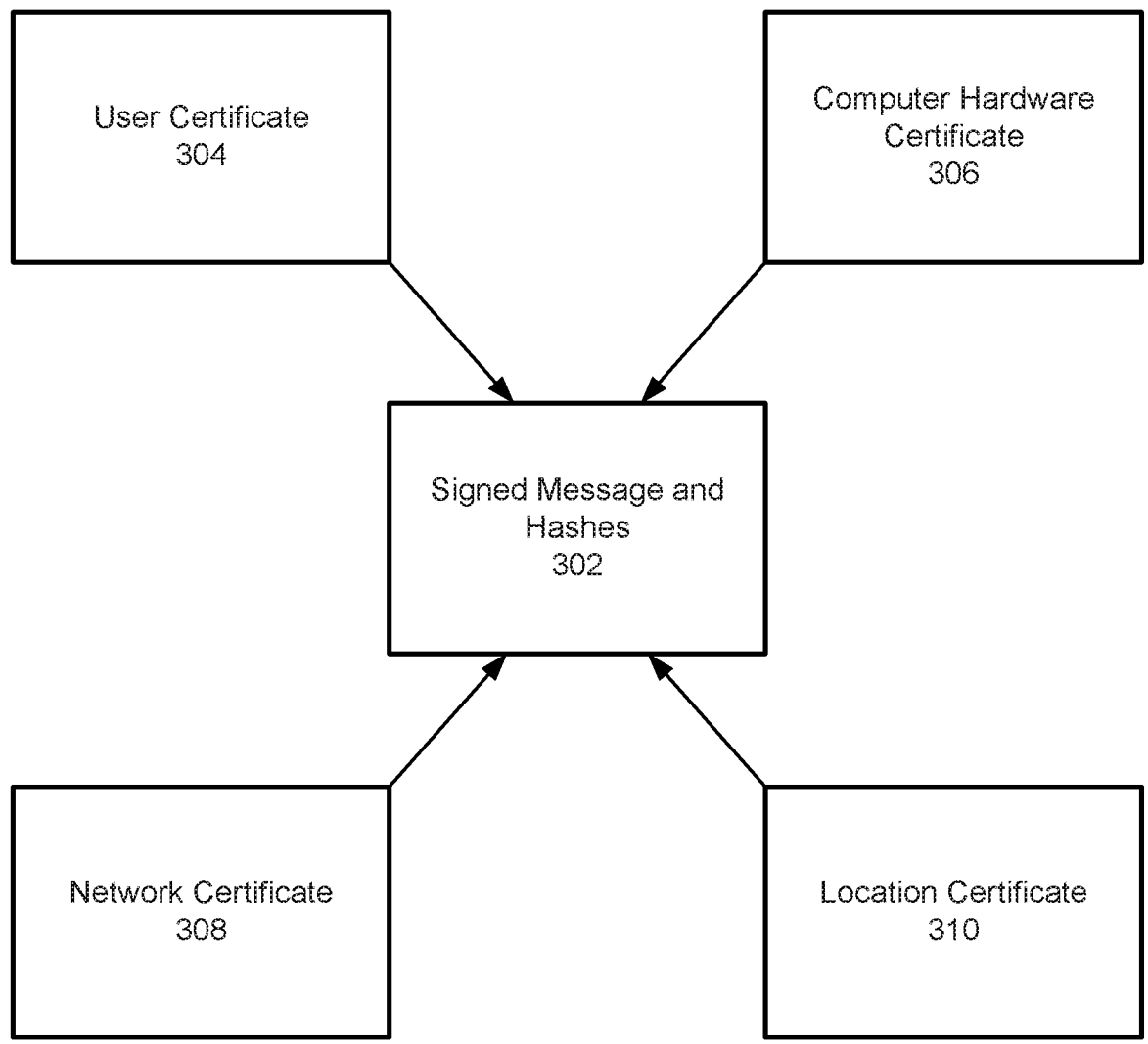
FIG. 3 depicts a block diagram illustrating a sample set of certificates for signing a secure message, in accordance with an embodiment of the present disclosure.

As further shown in FIG. 2, the one or more processors can digitally sign 206 the message and the hash values using one or more digital certificates. As used herein, digitally signing a message refers to presenting authenticity of a message using a mathematical scheme. In certain implementations, a specific set of certificates can be used to digitally sign 206 the message and hash values. For example, as shown in FIG. 3, a user certificate 304, a computer hardware certificate 306, a network certificate 308, and a location certificate 310 can be used to digitally sign the message and hash values 302 (as shown in block 206 of FIG. 2).

As described herein, a user certificate 304 can include a certificate generated specifically for an individual user, in this example the sender of the message. The user certificate 304 can be generated based upon several factors. For example, the user certificate 304 can be generated from a combination of the user's password and a universal second factor to provide for a simplified two-factor authentication when generating the user certificate.

As described herein, the computer hardware certificate 306 can include a certificate integrated into a trusted platform module (TPM), for example, a secure crypto-processor functioning as a dedicated microcontroller to secure hardware through the use of one or more cryptographic keys. In some examples, the computer hardware certificate 306 can be generated from a hash of the components of a physical computing device (e.g., a hash of the serial numbers of various components contained within a data transmitting device such as sending computer 102 as described above).

As described herein, the network certificate 308 can include verification that the sender is actually using the network they claim they are sending a message from (e.g., a specific secure network such as a company-controlled Intranet). As used herein, the network certificate 308 can prevent spoofing of IP and MAC addresses by a potentially malicious sender. In certain implementations, to obtain a network certificate 308, a computing device such as a data transmitting device as used in this example can transmit a request for the network certificate to a network verification server. As the request is propagated through the network, each node that the message passes through can sign the packets (e.g., using a node-specific private key). The network verification server can then independently verify each of the node hops the request took throughout the network. In some example, the network verification server can also maintain a map of the nodes in the network and compare the route the request took through the network to the map. If the route fits the map, the network verification server can determine with high confidence that the data transmitting device belongs to the network it is claiming. After verification, the network verification server can provide a network certificate to the data transmitting device for use in creating a digital signature as described herein.

As described herein, the location certificate 310 can include an indication of the data transmission device's geolocation when sending a message. There are two main types of geolocation: passive geolocation and active geolocation. Passive geolocation includes a process by which a user calculates their own geolocation by, for example, using signals from global positioning satellites (GPS). In certain implementations, a data transmitting device can scan its surrounding environment to determine proximity to known wireless devices such as Wi-Fi access points, cellular towers, GPS, X-ray pulsars, and other similar wireless devices. The data transmitting device can use the proximity information to approximate its position and generate a location certificate 310 including this position information. However, one drawback with passive geolocation is that a dishonest user can fake their location.

In contrast to passive geolocation, active geolocation includes a data transmission device sending information to one or more trusted devices having known locations which can independently verify the location of the user. One drawback with active geolocation is that an eavesdropper can intercept the location verification messages and use them to determine the sender's location. In a military context, this could be catastrophic as it could reveal position information to an enemy. Thus, in certain situations such as being in a warzone, passive geolocation can be used to keep location information hidden from eavesdroppers. Otherwise, active geolocation generally provides a stronger guarantee of a user's geolocation.

Figure 4:
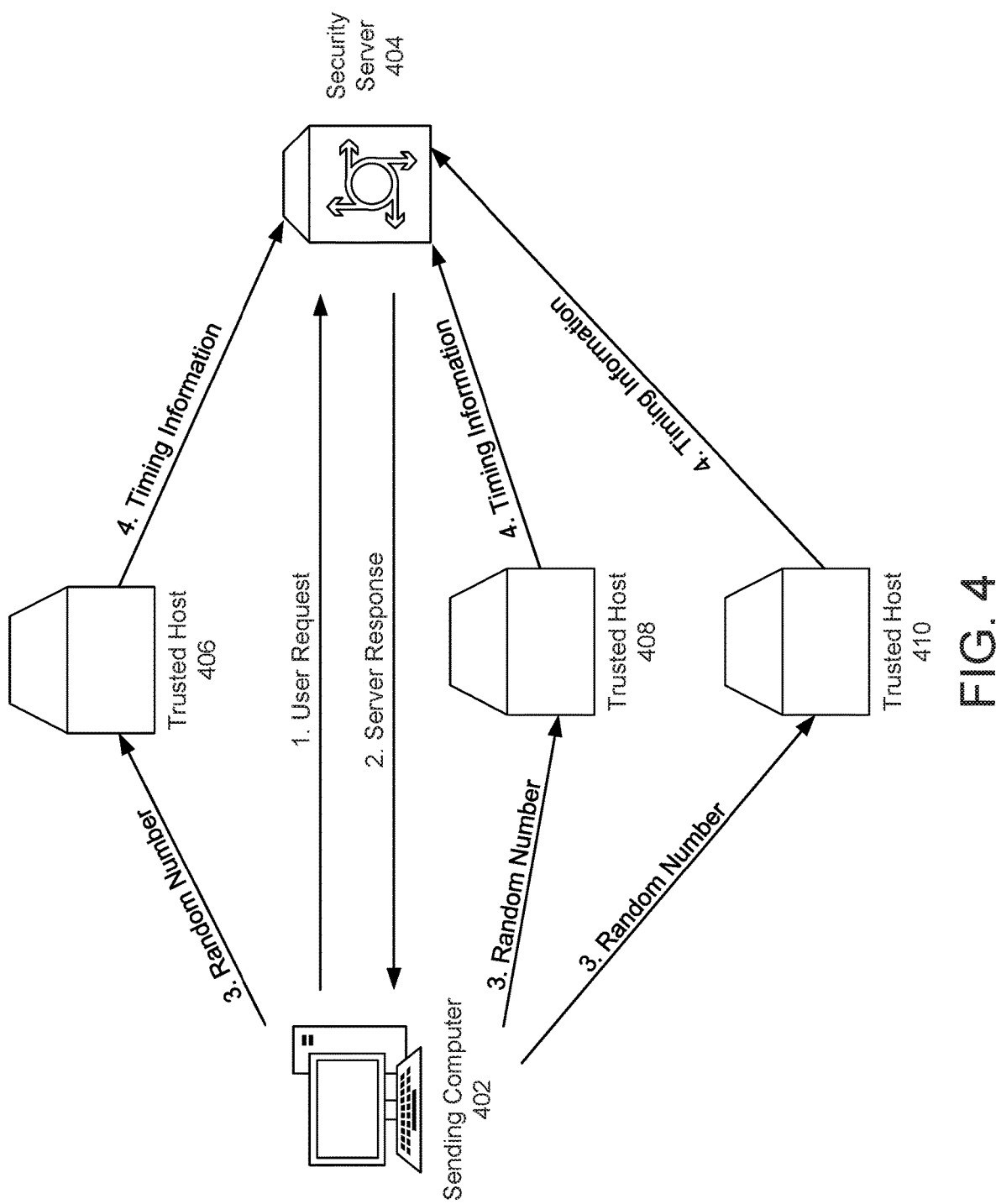
FIG. 4 depicts a sample flow of data through a network for generating and verifying a geolocation certificate, in accordance with an embodiment of the present disclosure.

When using active geolocation, a data transmitting device initially requests a location certificate from a security server. For example, FIG. 4 illustrates a sample network and data flow related to an active geolocation verification process. In certain implementations, a sending computer 402 transmits (1) a user request to security server 404. The security server 404 can receive the user request and provide (2) a server response. For example, the server response can include a list of trusted hosts having known locations and that are geographically spaced apart (e.g., trusted host 406, trusted host 408, and trusted host 410 as shown in FIG. 4) and a corresponding random number for each trusted host to the sending computer 402. The sending computer 402 can receive the list of trusted hosts and transmit (3) each random number to its corresponding trusted host. For example, as shown in FIG. 4, the sending computer 402 can transmit random number 1 to trusted host 406, random number 2 to trusted host 408, and random number 410 to trusted host 410.

Each of the trusted hosts 406, 408, 410 can receive their corresponding random numbers and time stamp the random numbers upon receipt. The trusted hosts 406, 408, 410 can forward (4) the timing information to the security server 404 for analysis and verification. Upon receipt of the timing information, the security server 404 can use the timing information to determine how long it took from the time the sending computer 402 transmitted the random number until the corresponding trusted host 406, 408, or 410 received the random number. As the amount of time it takes for information to travel is largely dependent upon distance (among various other things), and since the location of each of the trusted hosts 406, 408, 410 is known, the security server 404 can use the timing information to roughly trilaterate the location of the sending computer 402. This process for active geolocation is particularly effective if one of the trusted hosts 406, 408, or 410 is geographically close to the sending computer 402. The sending computer 402 can slow down the timing information (e.g., by delaying transmission of the random numbers upon receipt) but the sending computer cannot make the random numbers arrive quicker. As such, if a trusted host that is geographically close to the sending computer receives its random number late, the security server can determine that the sending computer is lying or otherwise faking its location.

Referring again to FIG. 4, once the security server has verified the location of the sending computer 402, the security server can issue the sending computer a location certificate (e.g., location certificate 310 as discussed above) to be used by the sending computer as a means for validating its location when signing a message and hash values.

Referring again to FIG. 3, it should be noted that the combination of a user certificate 304, a computer hardware certificate 306, a network certificate 308, and a location certificate 310 for use in creating the digitally signed message and hash values 302 is shown by way of example only. Various other combination of certificates including a subset of those shown in FIG. 3 can be used to digitally sign the message and hash values as described herein. Similarly, a set of certificates including additional certificates not illustrated in FIG. 3 can be used as well.

By providing a digital signature of the message and the hash values, the techniques as described herein provide improved authentication, data integrity, and non-repudiation. For authentication, the digital signature can be used to authenticate the source of the message. Ownership of the specific certificate (or, in this example, set of certificates) is bound to a specific user and a valid signature shows that the message was sent by the user. By comparing the authentication information as contained in the digital signature with the sender information associated with the message, a recipient can quickly verify that the message did originate from the sender. For data integrity, both the sender and the recipient of a message have a need for confidence that the message has not been altered during transmission. Although encryption (as described below) can hide the content of a message, it may be possible to change or otherwise corrupt an encrypted message without understanding the content of the message. However, if a message is digitally signed, any change in the message after signature invalidates the signature. For non-repudiation, an entity that has properly digitally signed a message cannot deny having signed the message at a later time. However, it should be noted that improved authentication, data integrity, non-repudiation, and other advantages of providing a digital signature rely on the specific set of certificates used to generate the digital signature being kept secret and non-revoked prior to their usage.

Referring back to FIG. 2, the one or more processors can encrypt 208 the signed messages and hash values. In certain implementations, a standard random-number based encryption technique can be used. For example, a one-time pad (OTP) encryption technique can be used. OTP is an encryption technique that uses a one-time pre-shared key the same size as, or longer than, the message being sent. In this technique, a plaintext or set of unencrypted information is paired with a random secret key (also referred to as a one-time pad). Then, each bit or character of the plaintext is encrypted by combining it with the corresponding bit or character from the pad using modular addition. If the key used is truly random, is at least as long as the plain text, is never reused in whole or in part, and is kept secret, the resulting ciphertext will be impossible to decrypt or break.

Figure 5:
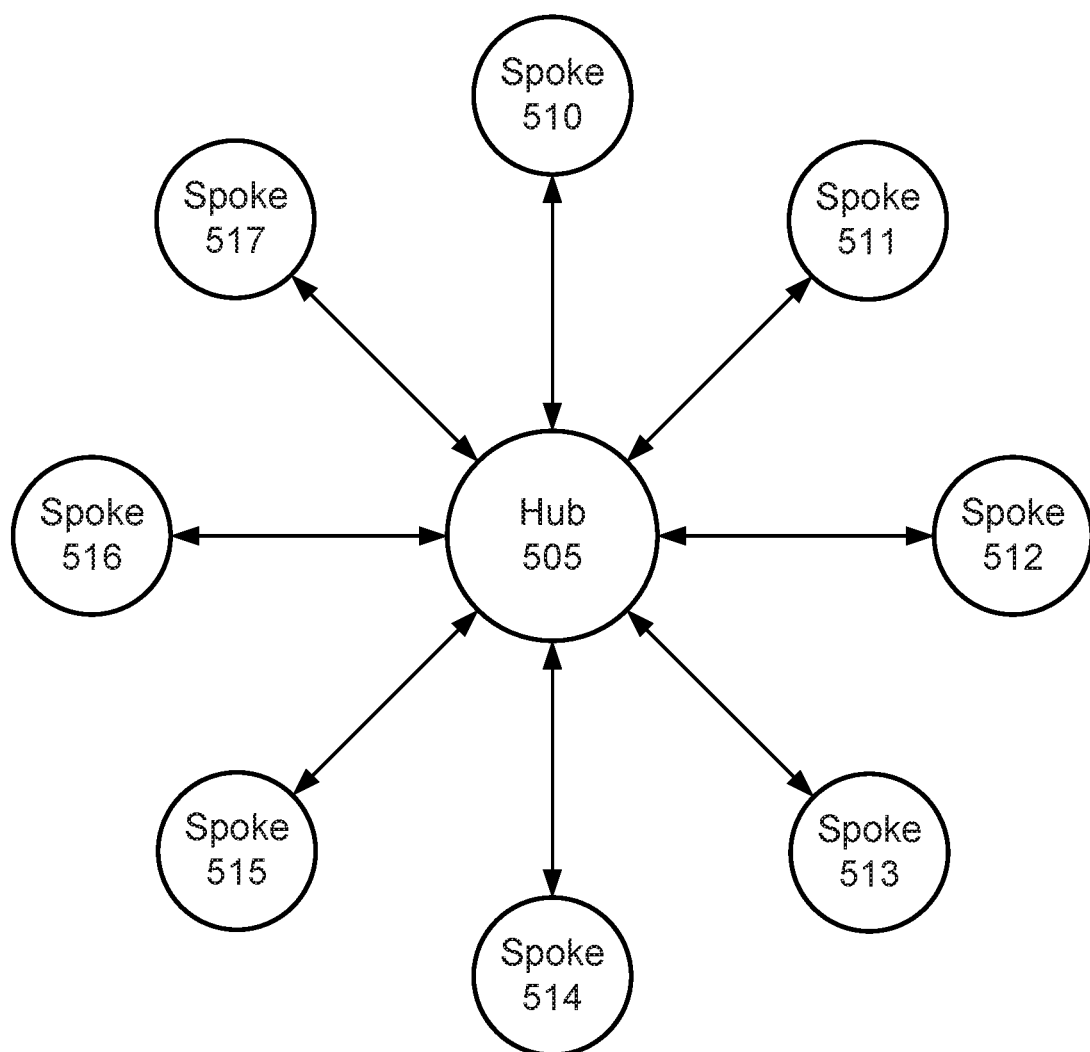
FIG. 5 depicts a block diagram illustrating a sample hub and spoke network architecture, in accordance with an embodiment of the present disclosure.

However, as noted, to use a OTP the key must be shared between users. For example, to continue the above example, for Alice to communicate with Bob, they must share a secret OTP. If Alice wishes to communicate with a third party (hereinafter termed "Charlie"), she and Charlie will need a second OTP. If Bob wants to communicate with Charlie as well, they will need a third OTP. This causes an undesirable increase in the number of secret keys being distributed throughout a group of users and increases the risk that one or more of the secret keys can be compromised. To address this problem, a spoke and wheel model can be used. For example, FIG. 5 illustrates a sample network 500 organized using a spoke and wheel model. The central hub 505 can be a trusted device such as security server 108 as described above. The hub 505 can be operably coupled to each of group member devices or spokes 510, 511, 512, 513, 514, 515, and 516 (hereinafter collectively referred to as "the spokes"). In this arrangement, the hub can store a copy of each spoke's secure key. As such, sending a message to a new member does not require a new key for each member in the network 500. For example, if spoke 517 joins network 517, it can exchange a key directly with the hub 505. Thus, existing members can simply send a message to the hub 505 with an indication that the message is directed to the new member spoke 517 and the hub can decrypt the message using the sender's secret key and encode using the new member's secret key. Thus, the burden of maintaining a large number of secret OTPs for each member in a network, as well as the risk that a secret OTP may be lost, is reduced.

Referring again to FIG. 2, the one or more processors can encapsulate the message and hash values. For example, the one or more processors can encapsulate 210 the message and hash values by performing one or more logic functions configured to performing a tunneling protocol such as a double virtual private network (VPN) tunnel. A tunneling protocol works by using the data portion of a packet (i.e., the payload) to carry packets that actually provide services such as remote addressing. Tunneling can use a layered protocol similar to the transmission control protocol/Internet protocol (TCP/IP) protocol suite, but typically violates the layering of traditional protocol suites by using the payload to carry a service not normally provided by the network the message is being transmitted over. Because tunneling involves repackaging the traffic data into a different form and is typically used with encryption as is described herein, it can further mask the nature of the traffic that is run through a tunnel.

After encapsulation, the one or more processors can transmit the message and hash values to the security server (e.g., security server 108 as shown in FIG. 1). In order to even more securely transmit the message over an untrusted network such as public network 106 as shown in FIG. 1, the one or more processors can transmit 212 the message and hash values using a secure transmission protocol such as the zero knowledge communication protocol described in U.S. patent application Ser. No. 16/114,654, filed Aug. 28, 2018, the content of which is incorporated herein by reference in its entirety. To briefly summarize, the zero knowledge communication protocol that unconditionally prevents an eavesdropper from gaining any information about the information being communicated. The protocol is based primarily on three key parts. First, the usage of a OTP as described above to provide unconditional confidentiality. Second, the constant sending of information so that an eavesdropper will not get any side channel information about when messages are and are not sent, or how large messages are. And finally, the use of an unconditional anonymity protocol to prevent an eavesdropper from being able to determine who is sending and who is receiving any given communication. With these three parts in place, an eavesdropper cannot know who, what, when, why, or where a message is being sent, unconditionally, and thus can obtain zero knowledge about the communication.

Figure 6:
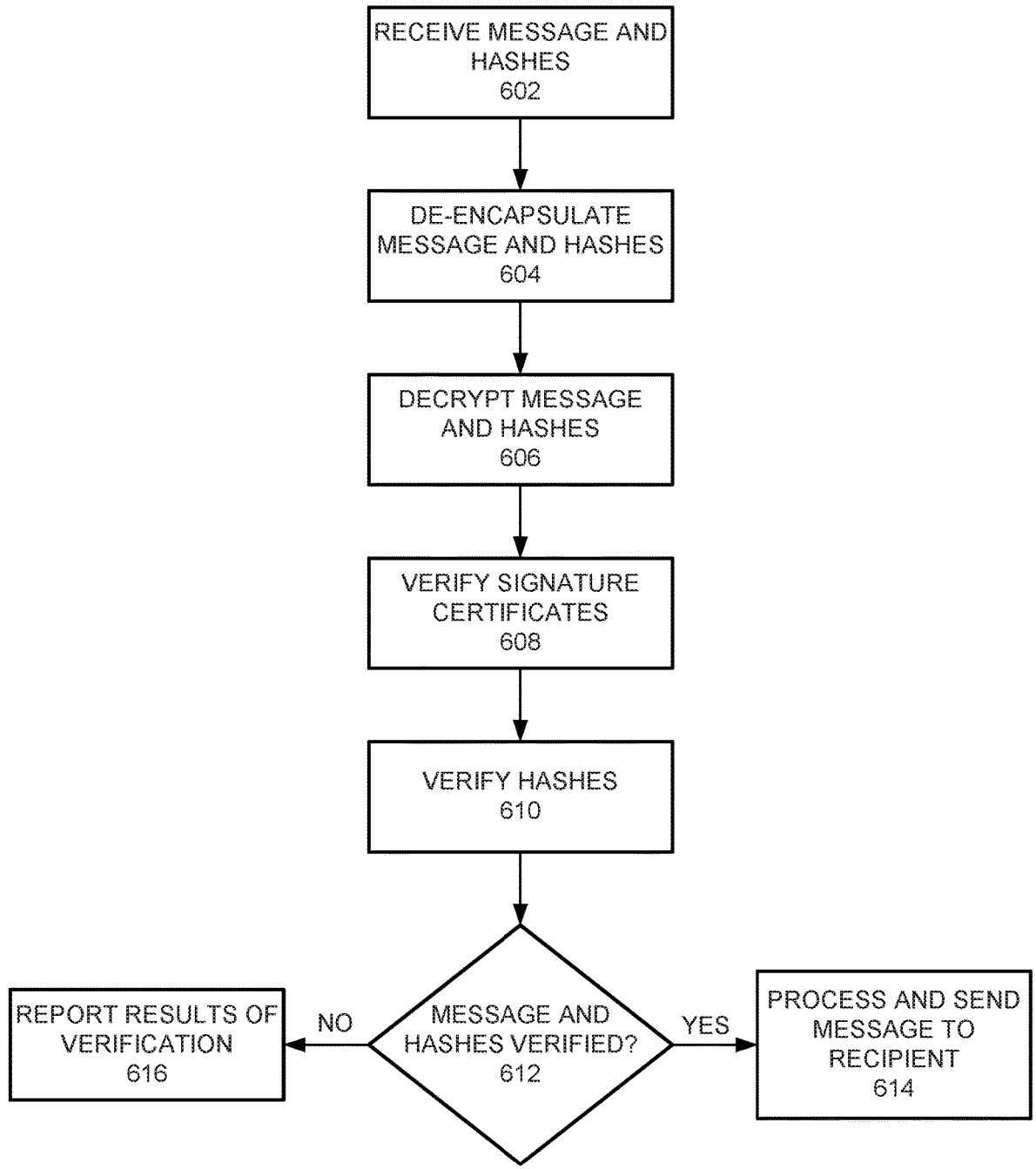
FIG. 6 depicts a flow diagram illustrating an example process for receiving and processing a secure message at a security server, in accordance with an embodiment of the present disclosure.

Referring now to FIG. 6, a process is illustrated that shows the steps taken by the security server upon receiving the transmitted message and hash values from block 212 of FIG. 2. Initially, the security server can receive 602 the message and hash values. As noted above in the discussion of FIG. 1, the security server can be located in the same secure network as the sending computer, in a public network, or in an alternate secure network. The security server can de-encapsulate 604 the message and hash values by, for example, passing the encapsulated message and hash values through a proper tunnel decryption technique for integrity checking and subsequent decryption. The security server can decrypt 606 the encrypted message and hash value using, for example, the sending device's secure OTP stored on the security server. Next, the security server can verify 608 the signature certificates. For example, the security server can verify 608 that the user certificate, the computer hardware certificate, the network certificate, and the location certificate as described above are authentic and have not been tampered with. The security server can further verify 610 that the hash values are accurate, and the data contained within the message has not been altered or otherwise tampered with during transmission of the message.

If the security server determines 612 that the message and hash values are verified, and the message has not been altered with or otherwise tampered with, the security server can process 614 the message and send the message to the recipient. If, conversely, the security server determines 612 that the message and hash values have not been verified and the message has been altered during transmission, the security server can report 616 the results of the verification. For example, the security server can be configured to notify the sender of the message as well as a network administrator or other security personnel of a potential malicious attack on the network or network traffic.

In the event that the security server does verify the message and hash values, the security server can process 614 and send the message to the recipient similar to the process as shown in FIG. 2. For example, the security server can create two or more hash values for the message, digitally sign the message and the hash values, and encrypt the message and hash values. However, unlike the previous encryption as described in regard to FIG. 2, rather than use the sender's secure OTP as was previously done, the security server can encrypt the message and hash values using the recipient's secure OTP. The security server can then encapsulate the message and the hash values and send the message and hash values to the recipient.

In certain implementations, the security server can perform additional processing to the message and hash values prior to sending the message to the recipient. In some examples, if the sender of the message is on a lower security network than the intended recipient, the security server can perform additional operations. For example, if the sender is on a secret network and the recipient is on a top-secret network, the security server can pass the message and hash values through a cross domain solution to transfer the message to the higher level network. For a second example, when a sender is on a higher level network and wishes to send a message to a lower level network the cross domain solution can allow for a subset of the message to pass through to the lower level (that subset that is of the lower level classification), depending on the configuration and capabilities of the cross domain solution.

Additionally or alternatively, in certain implementations the security server can pass the message through an anomaly detector to detect unusual traffic to provide some resistance to zero-day exploits and insider threats. For example, the anomaly detector can include a statistical analysis algorithm such as a change point detection algorithm to monitor network traffic for any statistical outliers in traffic patterns. The outliers can be further examined for indications of potential network threats such as a denial of service attacks or network device misuse.

Figure 7:
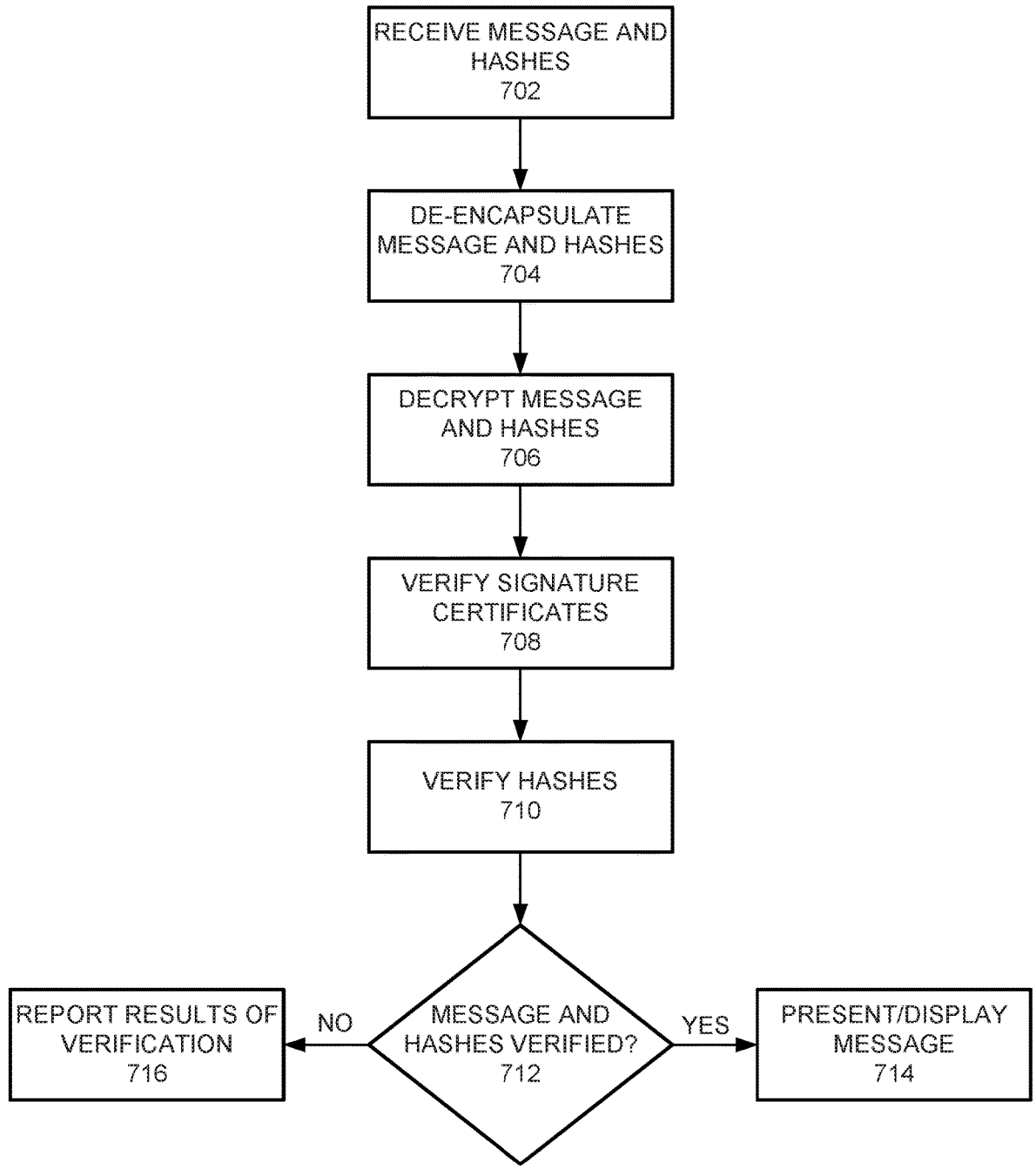
FIG. 7 depicts a flow diagram illustrating an example process for processing a received secure message, in accordance with an embodiment of the present disclosure.

Referring now to FIG. 7, a process is illustrated that shows the steps taken by the recipient computer upon receiving the message and hash values from the security server. Initially, the recipient computer can receive 702 the message and hash values. As noted above in the discussion of FIG. 1, the recipient computer can be located in the same secure network as the security server, in a public network, or in an alternate secure network. The recipient computer can de-encapsulate 704 the message and hash values by, for example, passing the encapsulated message and hash values through a proper tunnel decryption technique for integrity checking and subsequent decryption. The recipient computer can decrypt 706 the encrypted message and hash value using, for example, the recipient computer's secure OTP as stored on the security server and used by the security server when encrypting the message and the hash values. Next, the recipient computer can verify 708 the signature certificates. For example, the recipient computer can verify 708 that the user certificate, the computer hardware certificate, the network certificate, and the location certificate as described above and used by the security server to digitally sign the message and the hash values are authentic and have not been tampered with. The recipient computer can further verify 710 that the hash values are accurate, and the data contained within the message has not been altered or otherwise tampered with during transmission of the message.

If the recipient computer determines 712 that the message and hash values are verified, and the message has not been altered with or otherwise tampered with, the recipient computer can present and/or display 714 the message to the intended recipient. If, conversely, the recipient computer determines 712 that the message and hash values have not been verified and the message has been altered during transmission, the recipient computer can report 716 the results of the verification. For example, the recipient computer can be configured to notify the sender of the message, the recipient of the message, the security server, as well as a network administrator or other security personnel of a potential malicious attack on the network or network traffic.

It should be noted that the processes and techniques as described herein can be augmented and reconfigured to include additional features and operations. For example, various other types of encryption can be used in addition to or in place of the OTP encryption techniques as described above. For example, various types of encryption such as asymmetric encryption, symmetric encryption, symmetric key crypto (or secret key cryptography), and other types of encryption can be used or layered to improve both authentication and confidentiality.

For example, the encryption techniques as described herein can include OTP encryption along with two additional layers of encryption techniques as prescribed by the National Security Agency (NSA) for securing classified data over a public network such as the Internet. This can also be combined with a quantum-resistant outer layer such as those described in OpenSSL. By using a quantum-resistant outer layer, vulnerability to quantum computers and quantum algorithms is reduced as the computational complexity required to break a quantum-resistant outer layer is significantly increased.

Additionally, unconditional integrity can be provided by including an encrypted checksum that is sent along with the message to ensure that the message data has not been tampered with during transmission. For example, checksum methods such as MD6, SHA-3, BLAKE2b, Kangaroo Twelve, Whirlpool, RPIEMD-320, Tiger-192, and other similar unbroken checksum methods can be used.

Figure 8:
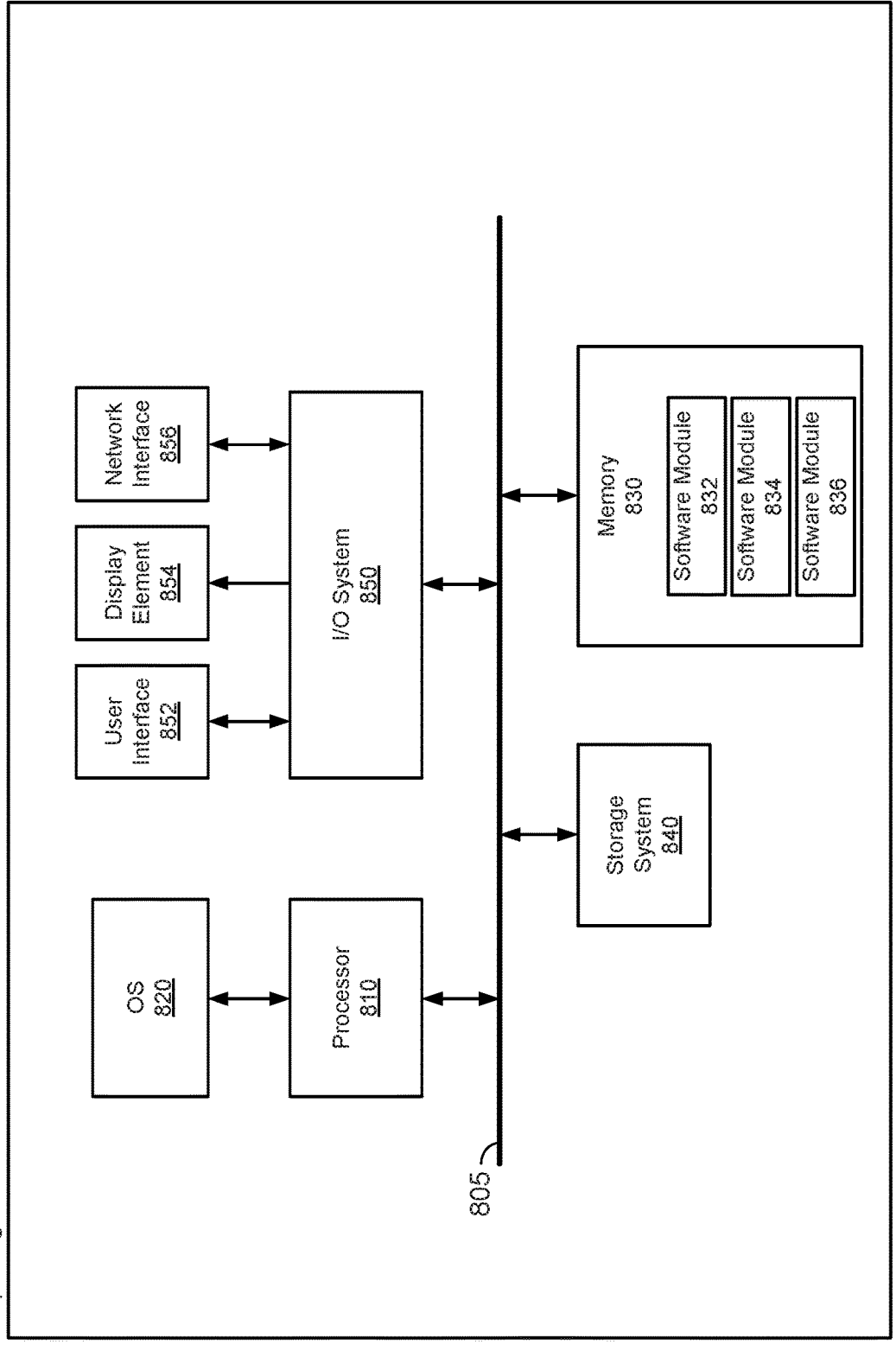
FIG. 8 depicts a block diagram of an example architecture of a computing device, in accordance with an embodiment of present disclosure.

FIG. 8 is a block diagram schematically illustrating a computing device 800, in accordance with certain of the embodiments disclosed herein. For example, computing device 800 can be used as one or more of sending computer 102, receiving computer 104, and security server 108 as described above in regard to FIG. 1.

In certain implementations, the computing device 800 can include any combination of a processor 810, a memory 830, a storage system 840, and an input/output (I/O) system 850. As can be further seen, a bus and/or interconnect 805 is also provided to allow for communication between the various components listed above and/or other components not shown. Other componentry and functionality not reflected in the block diagram of FIG. 8 will be apparent in light of this disclosure, and it will be appreciated that other embodiments are not limited to any particular hardware configuration.

The processor 810 can be any suitable processor, and may include one or more coprocessors or controllers, such as an audio processor, a graphics processing unit, or hardware accelerator, to assist in control and processing operations associated with computing device 800. In some embodiments, the processor 810 can be implemented as any number of processor cores. The processor (or processor cores) can be any type of processor, such as, for example, a microprocessor, an embedded processor, a digital signal processor (DSP), a graphics processor (GPU), a network processor, a field programmable gate array or other device configured to execute code. The processors can be multithreaded cores in that they may include more than one hardware thread context (or "logical processor") per core. Processor 810 can be implemented as a complex instruction set computer (CISC) or a reduced instruction set computer (RISC) processor.

In certain implementations, the processor 810 can be configured to execute an Operating System (OS) 820 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with computing device 800, and therefore may also be implemented using any suitable existing or subsequently-developed platform.

The memory 830 can be implemented using any suitable type of digital storage including, for example, flash memory and/or random-access memory (RAM). In some embodiments, the memory 830 can include various layers of memory hierarchy and/or memory caches as are known to those of skill in the art. The memory 830 can be implemented as a volatile memory device such as, but not limited to, a RAM, dynamic RAM (DRAM), or static RAM (SRAM) device. The storage system 840 can be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

In certain implementations, the memory 830 can include one or more software modules such as software module 832, software module 834, and software module 836 as shown in FIG. 8. The various software modules can include instructions that, when executed by processor 810, can cause the processor to perform one or more of the process steps and functions as described herein. For example, if computing device 800 represents the sending computer 102 as described herein, the various software modules 832, 834, 836 can include instructions for causing the processor 810 to perform the process as shown in FIG. 2 including, for example, causing the processor to create a message, create various hash values of the message, digitally sign the message and the hash values, encrypt the message and the hash values, encapsulate the message and the hash values, and cause transmission of the message and the hash values to another device. Similarly, if the computing device 800 represents the security server 108 as described herein, the various software modules 832, 834, 836 can include instructions for causing the processor 810 to perform the process as outlined in FIG. 6 including, for example, causing the processor to receive the message from the sending computer, de-encapsulate the message and hash values, decrypt the message and hash values, verify the digital signatures, verify the hash values, and process the message for transmission to the recipient. If the computing device 800 represents the recipient computer 104 as described herein, the various software modules 832, 834, 836 can include instructions for causing the processor 810 to perform the process as outlined in FIG. 7 including, for example, causing the processor to receive the message from the sending computer, de-encapsulate the message and hash values, decrypt the message and hash values, verify the digital signatures, verify the hash values, and present the message to the recipient.

The I/O system 850 can be configured to interface between various I/O devices and other components of the computing device 800. I/O devices may include, but not be limited to, a user interface 852, a display element 854, and a network interface 856.

It will be appreciated that in some embodiments, the various components of computing device 800 can be combined or integrated in a system-on-a-chip (SoC) architecture. In some embodiments, the components may be hardware components, firmware components, software components or any suitable combination of hardware, firmware or software.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. Other componentry and functionality not reflected in the illustrations will be apparent in light of this disclosure, and it will be appreciated that other embodiments are not limited to any particular hardware or software configuration. Thus, in other embodiments the computing device 800 can include additional, fewer, or alternative subcomponents as compared to those included in the example embodiment of FIG. 8.

FURTHER EXAMPLE EMBODIMENTS

The following examples pertain to further embodiments, from which numerous permutations and configurations will be apparent. It should be noted that the following examples are directed to implementations involving the sending device, but similar examples can be envisioned regarding the security server and the recipient device.

Example 1 includes a computer program product including one or more non-transitory machine-readable mediums encoding instructions that when executed by one or more processors cause a process to be carried out securing a message to be transmitted, the process including receiving an initial message, generating a plurality of hash values for the initial message, digitally signing the initial message and the plurality of hash values using one or more certificates to generate a signed message and a set of signed hash values, encrypting the signed message and the set of signed hash values using at least one encryption technique to generate an encrypted message and a set of encrypted hash values, encapsulating the encrypted message and the set of encrypted hash values using at least one encapsulation protocol to create an encapsulated message and an encapsulated set of hash values, and causing transmission of the encapsulated message and the encapsulated set of hash values over an untrusted network.

Example 2 includes the subject matter of Example 1, wherein a first hash value of the plurality of hash values is generated using a first hash protocol, and a second hash value of the plurality of hash values is generated using a second hash protocol different from the first hash protocol.

Example 3 includes the subject matter of Example 1 or 2, wherein the one or more certificates include one or more of a user certificate, a computer hardware certificate, a network certificate, and a location certificate.

Example 4 includes the subject matter of Example 3, wherein the location certificate is generated using one of passive geolocation and active geolocation.

Example 5 includes the subject matter of Example 4, wherein active geolocation includes trilateration of a geographic location based upon timing information determined based upon messages sent by the one or more processors to a plurality of trusted hosts.

Example 6 includes the subject matter of any of the preceding Examples, wherein the at least one encryption technique includes a one-time pad encryption scheme that uses a one-time shared key.

Example 7 includes the subject matter of any of the preceding Examples, wherein the at least one encapsulation protocol includes a tunneling protocol. In some examples, the tunneling protocol includes a double virtual private network protocol.

Example 8 includes the subject matter of any of the preceding Examples, wherein causing transmission of the encapsulated message and the encapsulated set of hash values includes causing transmission of the encapsulated message and the encapsulated set of hash values using a zero knowledge communication protocol.

Example 9 includes the subject matter of Example 8, wherein the zero knowledge communication protocol includes both causing constant transmission of data before and after transmitting the encapsulated message and the encapsulated set of hash values and use of an unconditional anonymity protocol.

Example 10 includes a communication system including one or more non-transitory machine-readable mediums configured to store instructions and one or more processors configured to execute the instructions stored on the one or more non-transitory machine-readable mediums, wherein execution of the instructions causes the one or more processors to receive an initial message, generate a plurality of hash values for the initial message, digitally sign the initial message and the plurality of hash values using one or more certificates to generate a signed message and a set of signed hash values, encrypt the signed message and the set of signed hash values using at least one encryption technique to generate an encrypted message and a set of encrypted hash values, encapsulate the encrypted message and the set of encrypted hash values using at least one encapsulation protocol to create an encapsulated message and an encapsulated set of hash values, and cause transmission of the encapsulated message and the encapsulated set of hash values over an untrusted network.

Example 11 includes the subject matter of Example 10, wherein a first hash value of the plurality of hash values is generated using a first hash protocol, and a second hash value of the plurality of hash values is generated using a second hash protocol different from the first hash protocol.

Example 12 includes the subject matter of Example 10 or 11, wherein the one or more certificates include one or more of a user certificate, a computer hardware certificate, a network certificate, and a location certificate. In certain implementations, the location certificate is generated using one of passive geolocation and active geolocation. In some examples, the active geolocation includes trilateration of a geographic location based upon timing information determined based upon messages sent by the one or more processors to a plurality of trusted hosts.

Example 13 includes the subject matter of any of Examples 10-12, wherein the at least one encryption technique includes a one-time pad encryption scheme that uses a one-time shared key. In certain implementations, the at least one encapsulation protocol includes a tunneling protocol. In certain implementations, the tunneling protocol includes a double virtual private network protocol.

Example 14 includes the subject matter of any of Examples 10-13, wherein causing transmission of the encapsulated message and the encapsulated set of hash values includes causing transmission of the encapsulated message and the encapsulated set of hash values using a zero knowledge communication protocol. In certain implementations, the zero knowledge communication protocol includes both causing constant transmission of data before and after transmitting the encapsulated message and the encapsulated set of hash values and use of an unconditional anonymity protocol.

Example 15 includes a computer program product including one or more non-transitory machine-readable mediums encoding instructions that when executed by one or more processors cause a process to be carried out for securely storing data at a remote data store, the process including receiving an encrypted message to be sent to a recipient device, de-encapsulating the encrypted message and a plurality of hash values associated with the encrypted message, decrypting the encrypted data and the plurality of hash values using a secret key associated with the sender of the encrypted message to produce a decrypted message, verifying at least one digital signature for the decrypted message and the plurality of hash values, verifying the plurality of hash value, processing the decrypted message to produce a processed message for transmission to the recipient device, and causing transmission of the processed message to the recipient device over an untrusted network.

Example 16 includes the subject matter of Example 15, wherein processing the decrypted message to produce a processed message for transmission to the recipient device includes generating a second plurality of hash values for the decrypted message, digitally signing the decrypted message and the second plurality of hash values using one or more certificates to generate a signed message and a set of signed hash values, encrypting the signed message and the set of signed hash values using a secret key associated with the recipient device, encapsulating the encrypted message and the set of encrypted hash values using at least one encapsulation protocol to create an encapsulated message and an encapsulated set of hash values, and causing transmission of the encapsulated message and the encapsulated set of hash values to the recipient device over the untrusted network.

Example 17 includes the subject matter of Example 15 or 16, wherein causing transmission of the encapsulated message and the encapsulated set of hash values includes causing transmission of the encapsulated message and the encapsulated set of hash values using a zero knowledge communication protocol.

Example 18 includes the subject matter of any of Examples 15-17, wherein the zero knowledge communication protocol includes both causing constant transmission of data before and after transmitting the encapsulated message and the encapsulated set of hash values and use of an unconditional anonymity protocol.

Example 19 includes the subject matter of any of Examples 15-18, wherein processing the message to produce a processed message for transmission to the recipient device comprises performing a cross-domain translation to alter a security classification of the message for transmission to the recipient device.

Example 20 includes the subject matter of any of Examples 15-19, wherein the process for securely receiving and processing data further comprises monitoring data traffic on the network and performing anomaly detection on the data traffic to detect one or more network threats.

Additional examples can include specific examples related to, for example, recipient computer 104 as described above. For example, the recipient computer can include a computer program product including one or more non-transitory machine-readable mediums encoding instructions that when executed by one or more processors cause a process to be carried out for securely receiving data, the process including receiving an encrypted message from a security server, de-encapsulating the encrypted message and a plurality of hash values associated with the encrypted message, decrypting the encrypted data and the plurality of hash values using a secret key associated with the recipient computer, verifying at least one digital signature for the decrypted message and the plurality of hash values, verifying the plurality of hash value, and processing the decrypted message for display or delivery to a recipient of the message.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer program product including one or more non-transitory machine-readable mediums encoding instructions that when executed by one or more processors cause a process to be carried out securing a message to be communicated, the process comprising:
receiving an initial message;
generating a plurality of hash values for the initial message;
digitally signing the initial message and the plurality of hash values using one or more certificates to generate a signed message and a set of signed hash values;
wherein one of the one or more certificates is a location certificate generated using active geolocation and wherein the active geolocation comprises trilateration of geographic location based upon timing information of a message sent to a plurality of trusted hosts and a plurality of random numbers sent to the plurality of trusted hosts using a zero knowledge protocol, each random number in the plurality of random numbers corresponding to an individual one of the plurality of trusted hosts;

encrypting the signed message and the set of signed hash values using a random secret key to generate an encrypted message and a set of encrypted hash values;

encapsulating the encrypted message and the set of encrypted hash values using at least one encapsulation protocol to create an encapsulated message and an encapsulated set of hash values;

causing transmission of the encapsulated message, and the encapsulated set of hash values to a security server using the zero knowledge communication protocol, wherein the zero knowledge communication protocol comprises both: causing constant transmission of data before and after transmitting the encapsulated message, the encapsulated set of hash values and the message sent to a plurality of trusted hosts; and use of an unconditional anonymity protocol to prevent an eavesdropper from being able to determine who is sending and who is receiving any given communication;

receiving an encapsulated encrypted message on the security server;

de-encapsulating the encrypted message and the plurality of hash values associated with the encrypted message;

decrypting the encrypted message and the plurality of hash values using the random secret key associated with a sender of the encrypted message to generate a decrypted message;

verifying at least one digital signature for the decrypted message and the plurality of hash values;

verifying the plurality of hash values; and processing the decrypted message to produce a processed message for transmission to a recipient device.

2. The computer program product of claim 1, wherein a first hash value of the plurality of hash values is generated using a first hash protocol, and a second hash value of the plurality of hash values is generated using a second hash protocol different from the first hash protocol.

3. The computer program product of claim 1, wherein one of the remaining one or more certificates comprise one or more of a user certificate, a computer hardware certificate, and a network certificate.

4. The computer program product of claim 3, further comprising a location certificate generated using passive geolocation.

5. The computer program product of claim 1, wherein the random secret key comprises a one-time pad encryption scheme that uses a one-time shared key.

6. The computer program product of claim 1, wherein the at least one encapsulation protocol comprises a tunneling protocol.

7. The computer program product of claim 1, further comprising a central hub of the security server for storing a plurality of secret keys.

8. A communication system comprising:

one or more non-transitory machine-readable mediums configured to store instructions; and one or more non-transitory machine-readable mediums configured to store instructions;

and one or more processors configured to execute the instructions stored on the one or more non-transitory machine-readable mediums, wherein execution of the instructions causes the one or more processors to receive an initial message, generate a plurality of hash values for the initial message, digitally sign the initial message and the plurality of hash values using one or more certificates to generate a signed message and a set of signed hash values, wherein one of the one or more certificates is a location certificate generated using active geolocation and wherein the active geolocation comprises trilateration of geographic location based upon timing information of a message sent to a plurality of trusted hosts and a plurality of random numbers sent to the plurality of trusted hosts using a zero knowledge protocol, each random number in the plurality of random numbers corresponding to an individual one of the plurality of trusted hosts;

encrypt the signed message and the set of signed hash values using at least one random secret key to generate an encrypted message and a set of encrypted hash values, encapsulate the encrypted message and the set of encrypted hash values using at least one encapsulation protocol to create an encapsulated message and an encapsulated set of hash values, cause transmission of the encapsulated message and the encapsulated set of hash values to a security server using the zero knowledge communication protocol, wherein the zero knowledge communication protocol comprises the following: to cause constant transmission of data before and after transmitting the encapsulated message, the encapsulated set of hash values and the message sent to a plurality of trusted hosts; and to use an unconditional anonymity protocol to prevent an eavesdropper from being able to determine who is sending and who is receiving any given communication;

receive an encapsulated-encrypted message on the security server;

de-encapsulate the encrypted message and the plurality of hash values associated with the encrypted message;

decrypt the encrypted message and the plurality of hash values using the random secret key to generate a decrypted message;

verify at least one digital signature for the decrypted message and the plurality of hash values;

verify the plurality of hash values; and process the decrypted message to produce a processed message for transmission to a recipient device.

9. The system of claim 8, wherein a first hash value of the plurality of hash values is generated using a first hash protocol, and a second hash value of the plurality of hash values is generated using a second hash protocol different from the first hash protocol.

10. The system of claim 8, wherein the one of the remaining one or more certificates comprise one or more of a user certificate, a computer hardware certificate, and a network certificate.

11. The system of claim 8, wherein the random secret key comprises a one-time pad encryption scheme that uses a one-time shared key.

12. A computer program product including one or more non-transitory machine-readable mediums encoding instructions that when executed by one or more processors cause a process to be carried out for securely communicating data, the process comprising:

receiving an encrypted message at a recipient device;

de-encapsulating the encrypted message and a plurality of hash values associated with the encrypted message;

decrypting the encrypted message and the plurality of hash values using a random secret key associated with a sender of the encrypted message to generate a decrypted message;

verifying at least one digital signature for the decrypted message and the plurality of hash values;
verifying the plurality of hash values;
processing the decrypted message to produce a processed message for transmission to the recipient device;
causing transmission of the processed message to the recipient device to a security server using a zero knowledge communication protocol, wherein the zero knowledge communication protocol comprises both: causing constant transmission of data before and after transmitting the processed message; and use of an unconditional anonymity protocol to prevent an eavesdropper from being able to determine who is sending and who is receiving any given communication;
wherein processing the decrypted message to produce the processed message for transmission to the recipient device comprises:
generating a second plurality of hash values for the decrypted message;
digitally signing the decrypted message and the second plurality of hash values using one or more certificates to generate a signed message and a set of signed hash values;
wherein one of the one or more certificates is a location certificate generated using active geolocation and wherein the active geolocation comprises trilateration of geographic location based upon timing information of a message sent to a plurality of trusted hosts and a plurality of random numbers sent to the plurality of trusted hosts using the zero knowledge protocol, each random number in the plurality of random numbers corresponding to an individual one of the plurality of trusted hosts;
encrypting the signed message and the set of signed hash values using a random secret key associated with the recipient device to produce an encrypted message and a set of encrypted hash values;
encapsulating the encrypted message and the set of encrypted hash values using at least one encapsulation protocol to create an encapsulated message and an encapsulated set of hash values; and
causing transmission of the encapsulated message and the encapsulated set of hash values to the recipient device over an untrusted network.

13. The computer program product of claim 12, wherein processing the decrypted message to produce a processed message for transmission to the recipient device comprises performing a cross-domain translation to ensure that only a subset of the decrypted message which is of an appropriate classification may be transmitted to the recipient device.

14. The computer program product of claim 12, wherein the process for securely receiving and processing data further comprises:
monitoring data traffic on the untrusted network by the security server; and performing anomaly detection on the data traffic to detect one or more network threats.

* * * * *